UNITED STATES PATENT OFFICE.

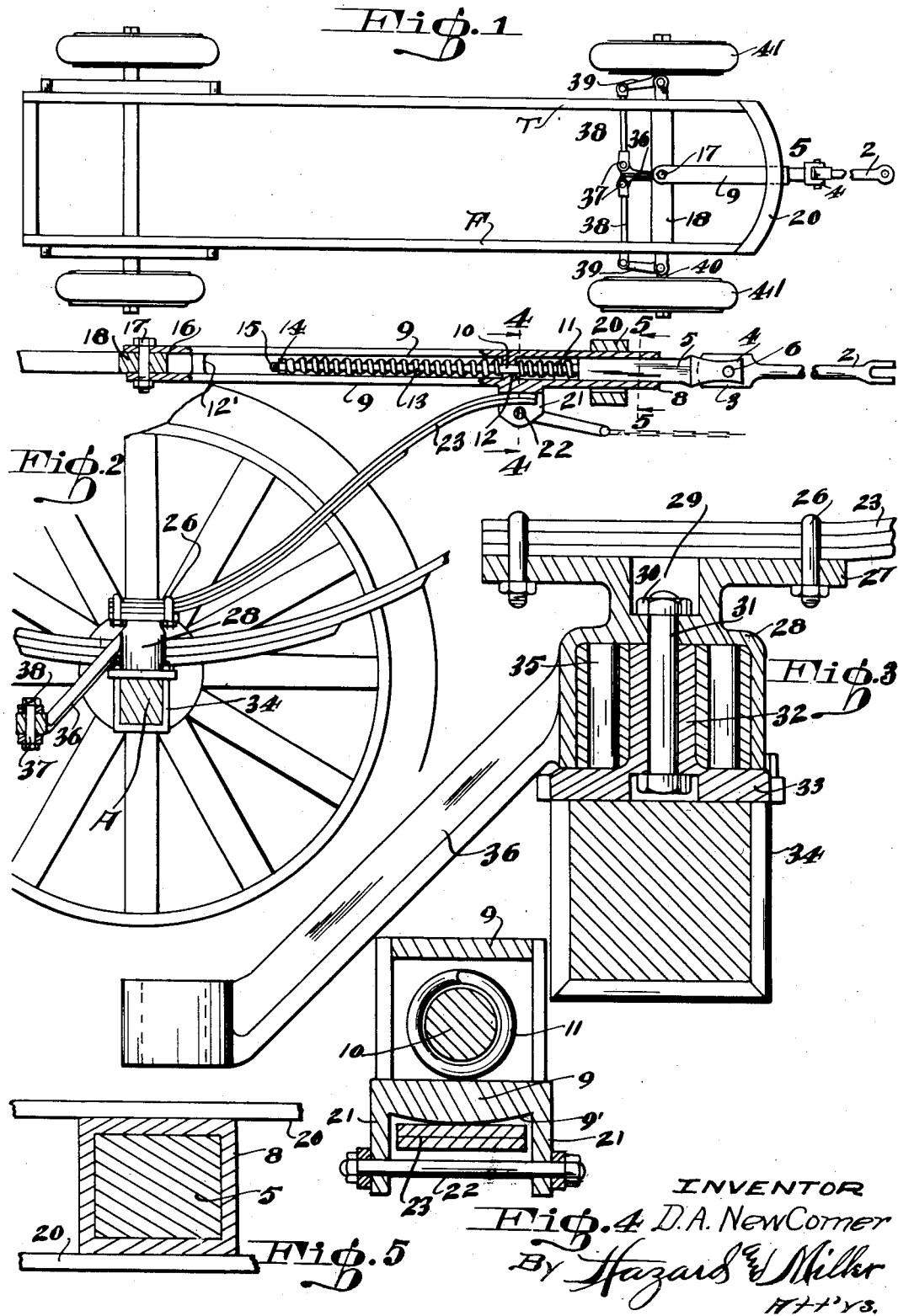

DANIEL A. NEW COMER, OF LOS ANGELES, CALIFORNIA, ASSIGNOR TO CORWIN R. WELCH AND EARL R. CLAYTON, BOTH OF LOS ANGELES, CALIFORNIA.

STEERING GEAR AND DRAWBAR FOR TRAILERS.

1,403,442.     Specification of Letters Patent.     Patented Jan. 10, 1922.

Application filed March 19, 1920. Serial No. 367,115.

*To all whom it may concern:*

Be it known that I, DANIEL A. NEW COMER, a citizen of the United States, residing at Los Angeles, in the county of Los Angeles and State of California, have invented new and useful Improvements in Steering Gears and Drawbars for Trailers, of which the following is a specification.

This invention relates to draw bar connections between a draft vehicle and a drawn vehicle and has for its object to provide an improved steering and draw bar connection that will be operative effectively and accurately in the operation of the vehicles; and a further object of the invention is to improve the construction of draw bar connections and combined steering means so that there may be a variation between the height of the draw bar means and the axle of the trailer without the tendency of the connecting steering means having a reactive steering effect; and further to provide for the variation of the draft connection without placing a torque on the associated steering member of the trailer. The invention consists of the construction, the combination and in details and arrangements of the parts, an embodiment of which invention is illustrated in the accompanying drawings and described and claimed herein.

Figure 1 is a plan view of a trailer to which the improved hitch is connected.

Fig. 2 is a detail sectional and elevational view medially of the front end structure of the trailer and of the draft device.

Fig. 3 is a detail section of the pivot connection of the trailer.

Fig. 4 is a cross section on line 4—4 of Fig. 2 showing the means of connecting the draft link and the trailer steering arm.

Fig. 5 is a cross section on line 5—5 of Fig. 2 through the core of the draw bar and its guide socket.

The present improved steering and draft bar comprises a front end hitch link 2 adapted to be connected at its leading end to a tractor or other leading vehicle the rear end of which link is flattened as at 3 to play between the forked end 4 of a draw bar shank 5. The flattened end 3 is pivoted in the socket 4 about a pin 6 to swing in a vertical plane.

The shank 5 of the draw bar is shown as non-circular in cross section, preferably being rectangular, and is guided in the adjacent socket end 8 of a draw bar link member formed of a pair of parallel upper and lower members 9—9 of which the socket 8 forms the front end. The shank 5 reciprocates in the socket 8 and is provided with a round stem 10 on the front end of which is coiled a cushion spring 11 butting against the squared end of the shank part 5; the opposite end of the spring 11 bearing against a lug 12 between the lower and upper parts 9 of the draw link.

On the rearwardly extending portion of the shank rod 10 is coiled a cushion spring 13 bearing at its front end against the web or connecting part 12 of the draw link, and the rear end of the spring is seated against a nut 14 adjustable on the rear threaded end 15 of the rod 10. Beyond the end of the rod the hollow link 9 is provided with a connection 12' beyond which is formed a yoke part 16 pivoted on a bolt 17 passing through a transverse member 18 of the trailer frame T.

The compound draft connection including the shank 5 and the hollow link 9 with the socket 8 is designed to swing in a horizontal plane on the pivot bolt 17 and is supported at the socket portion 8 between upper and lower arcuate guide means 20 connecting the forward ends of the frame T of the trailer; the socket part 8 being provided with parallel top and lower surfaces, as clearly shown in Fig. 5, so as to prevent rotation of the draft device about its own axis.

The lower front portion of the hollow link 9 is provided with a downwardly extending convex wearing lug or surface 9' on the ends of which are provided downwardly extending lugs or flanges 21 between which extends a cross bolt or supporting rod 22 the latter being spaced below the wearing face 9' a sufficient distance to provide for the play of the introduced upper end of a steering lever comprising, preferably, a resilient or spring leaf structure 23 that is designed to slide to and fro on the wearing surface 9' according to the variation in the height of the trailer frame F with respect to the front axle A of the trailer. The steering lever arm 23 is shown as curved downwardly toward the upper part of the axle A and on which it is mounted to swing about a vertical axis as by the following means.

The lower end of the spring lever 23 is secured as by U-bolts 26 to the flanges 27 formed at the front and rear of a box or shell 28 the top of which is countersunk at 29 to receive a nut 30 on the upper end of a pivot pin or bolt 31 extending through the head of the box 28 and through an upwardly extending hub or sleeve 32 that is provided on a plate or bearing 33 secured as by means of U-bolts 34 to the axle A.

Suitable roller bearings or other antifriction means 35 may be introduced between the hub part 32 and the cylinder of the box 28. Extending rearwardly from the cylinder of the box 28 is an inclined steering arm 36 the lower end of which is pivotally connected at 37 to oppositely extending links 38 the outer ends of which are connected to the steering arms 39 of the knuckles 40 of the front pivot wheels 41 of the trailer T.

From the above it will be seen that when the telescopic and yielding draft link 5—9 is first under tension the respective springs 11 and 13 will give according to the direction of force applied, that is in pulling or backing, and these springs absorb the shocks of starting and stopping.

When the leading vehicle is turned in its path of travel the draft link 5—9 swings about its pivot 17 which is vertically arranged over the pivot 31 of the central steering lever 23 and the latter, will through means of its arm 36 turn the knuckle arms 39. Should a variation in the level of the trailer frame occur as with respect to the axle A then the upper end of the spring lever 23 is free to play rearwardly and forwardly without transmitting any turning tendency to the arm 36 and, again, if the draft link part 9 tends to rotate on its own axis there is no torque transmitted to the adjacent end of the lever 23 because of the capacity of the latter to relatively roll on the convex seat 9' so that there is no turning tendency transmitted through the lever 23 either by loading or unloading of the trailer frame F or by rolling action of the connecting means between the upper end of the lever 23 and the link 9.

Various changes may be made without departing from the spirit of the invention as claimed.

What is claimed is:

1. A combined draft and steering rig for connecting a leading vehicle and a trailing vehicle, said rig comprising a draft link pivotally connected to the trailing vehicle frame; and means connecting the link with a steering device for turning the front steering wheels of the trailing vehicle concurrently with angular movement of the said link about its pivot, said means comprising a spring strip yieldable to compensate for relative vertical movement between said draft link and said steering device and front steering wheels.

2. In a combined draft and steering rig for connecting a draft vehicle and a trailing vehicle, a draft link, and connections between the draft link and steering wheels of the trailing vehicle; said connections including a spring strip yieldable to compensate for relative vertical movement between said draft link and steering wheels.

In testimony whereof I have signed my name to this specification.

D. A. NEW COMER.